Feb. 20, 1968    C. J. VAN DALEN ET AL    3,370,271
READING-DEVICE FOR AN INFORMATION BEARER
Filed Nov. 1, 1962                           13 Sheets-Sheet 2

FIG.3

INVENTORS
C. J. VAN DALEN AND
H. C. A. VAN DUUREN
BY
ATTORNEY

Feb. 20, 1968   C. J. VAN DALEN ET AL   3,370,271
READING-DEVICE FOR AN INFORMATION BEARER
Filed Nov. 1, 1962   13 Sheets-Sheet 3

INVENTORS
C. J. VAN DALEN AND
H. G. A. VAN DUUREN
BY

ATTORNEY

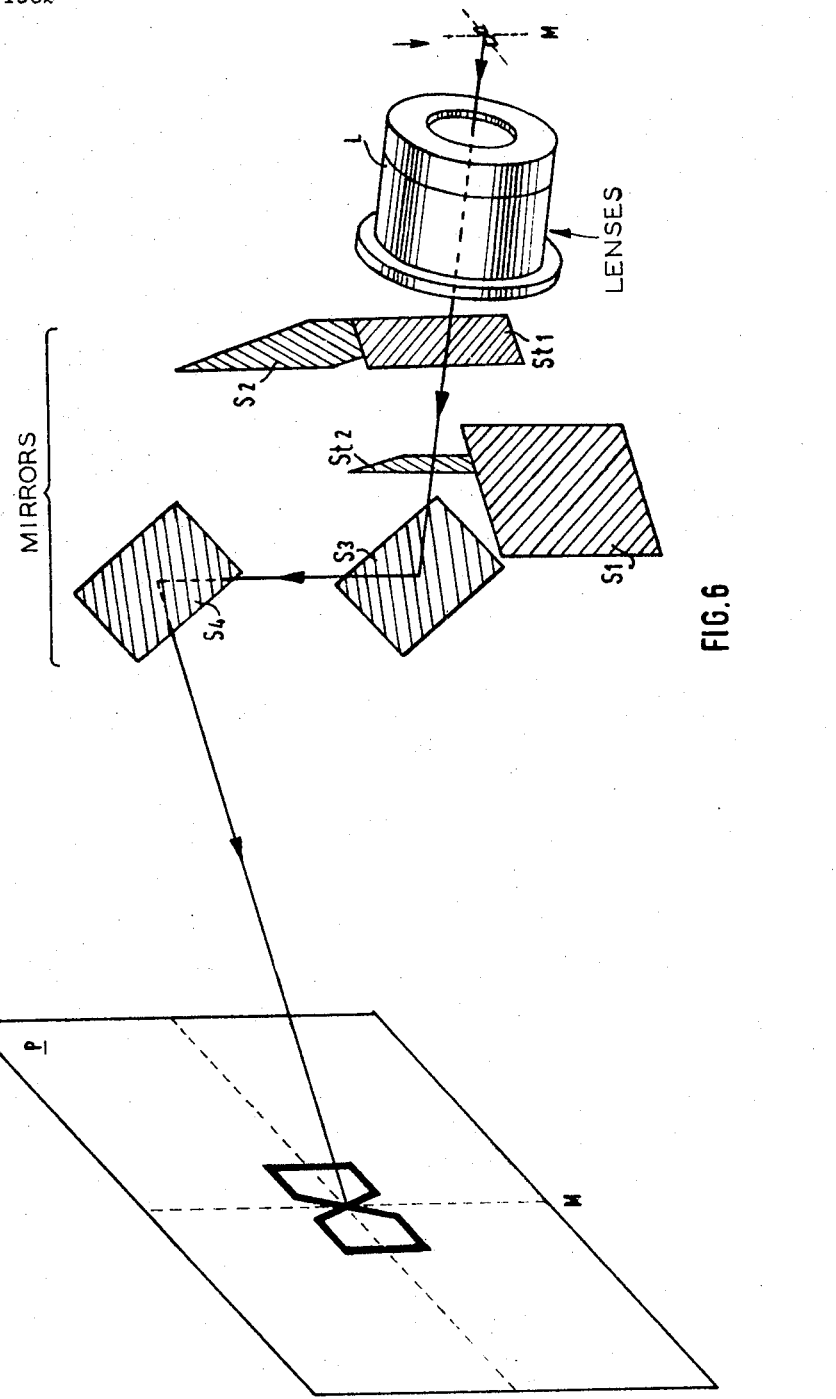

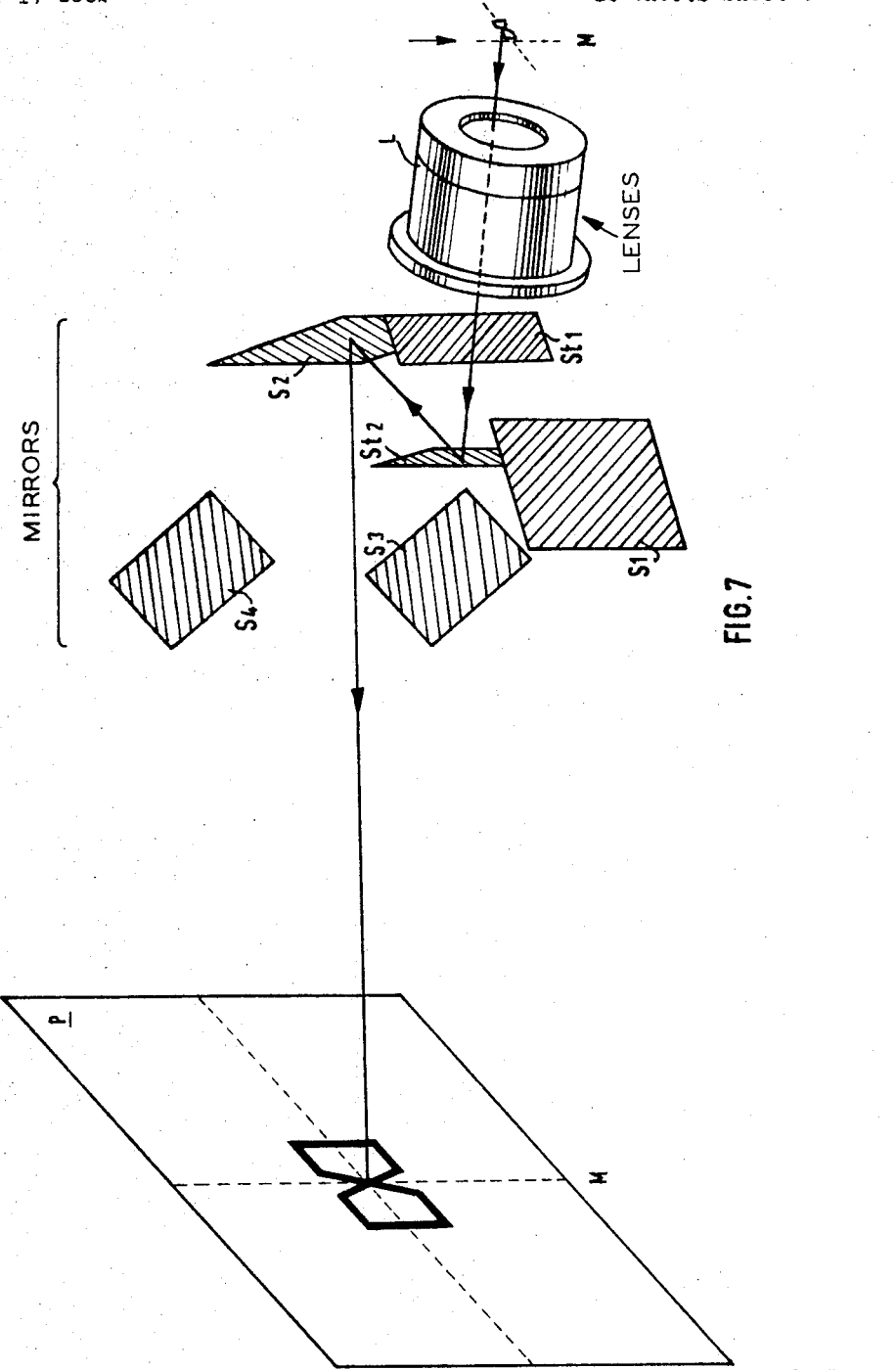

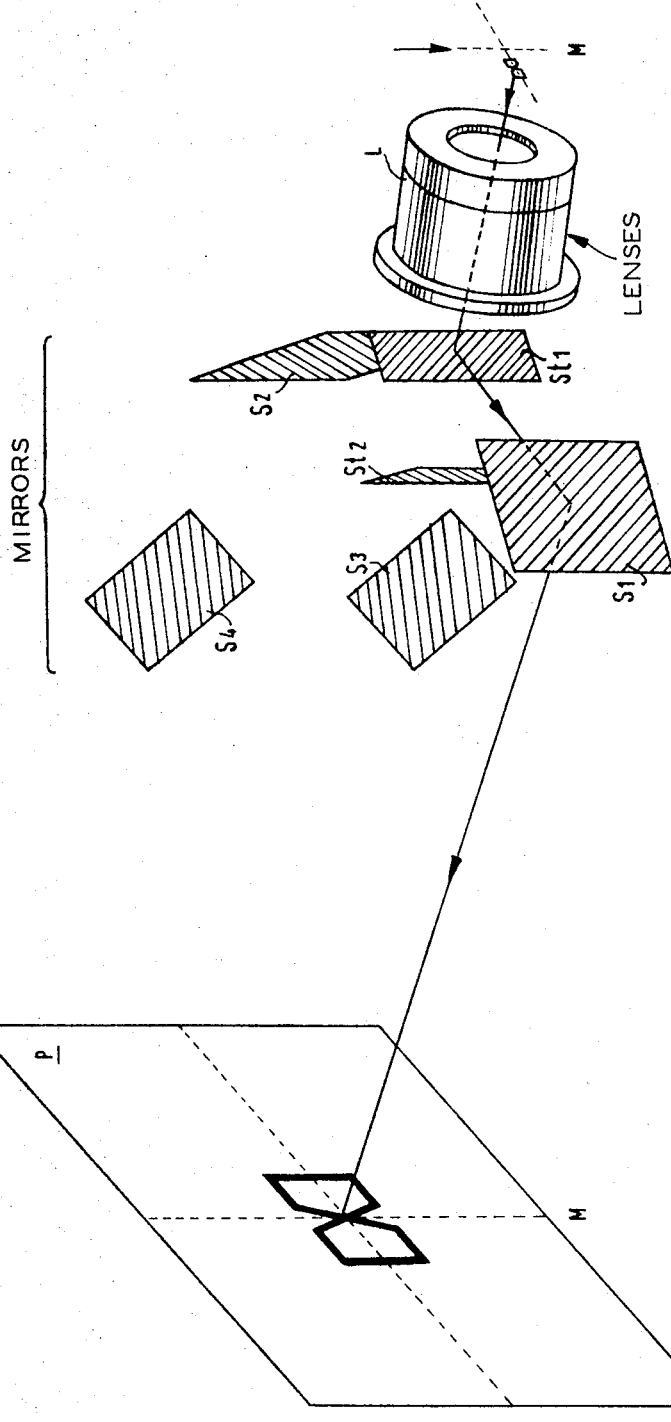

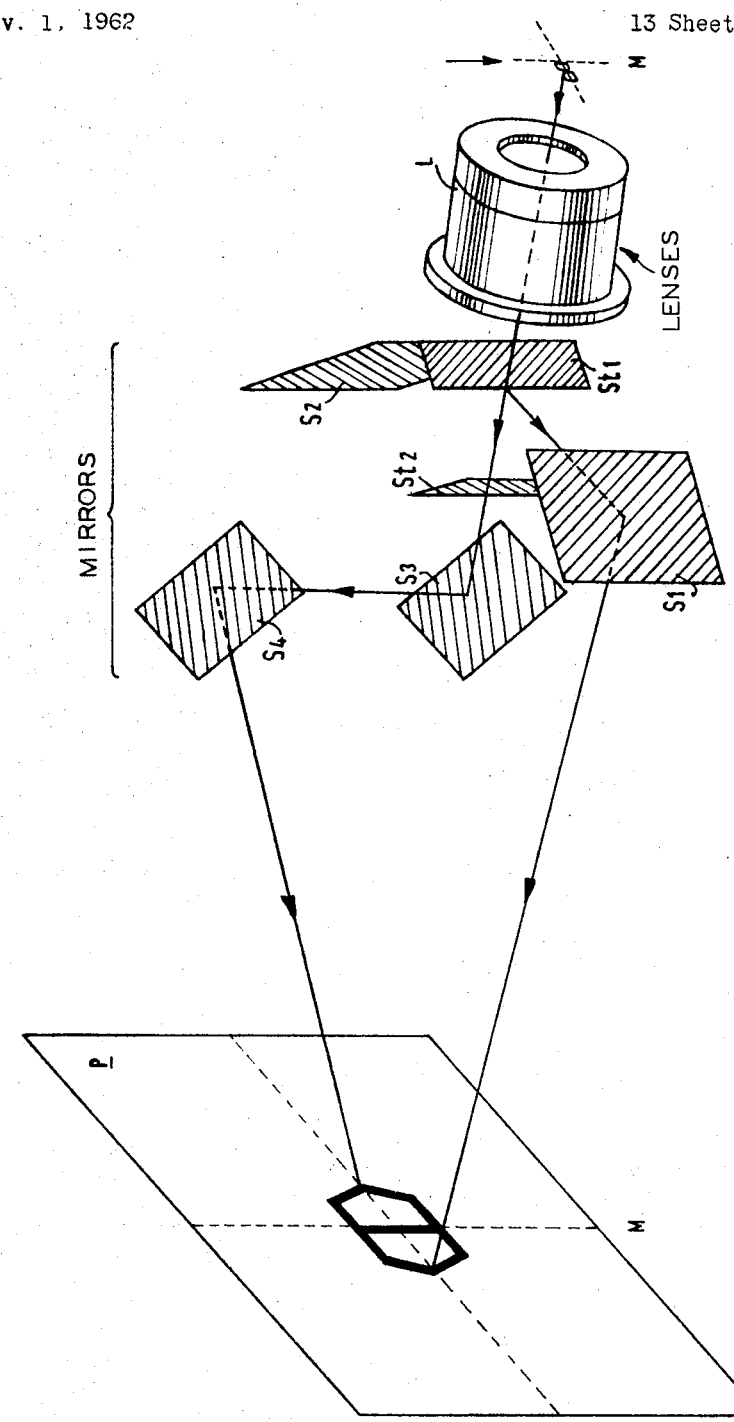

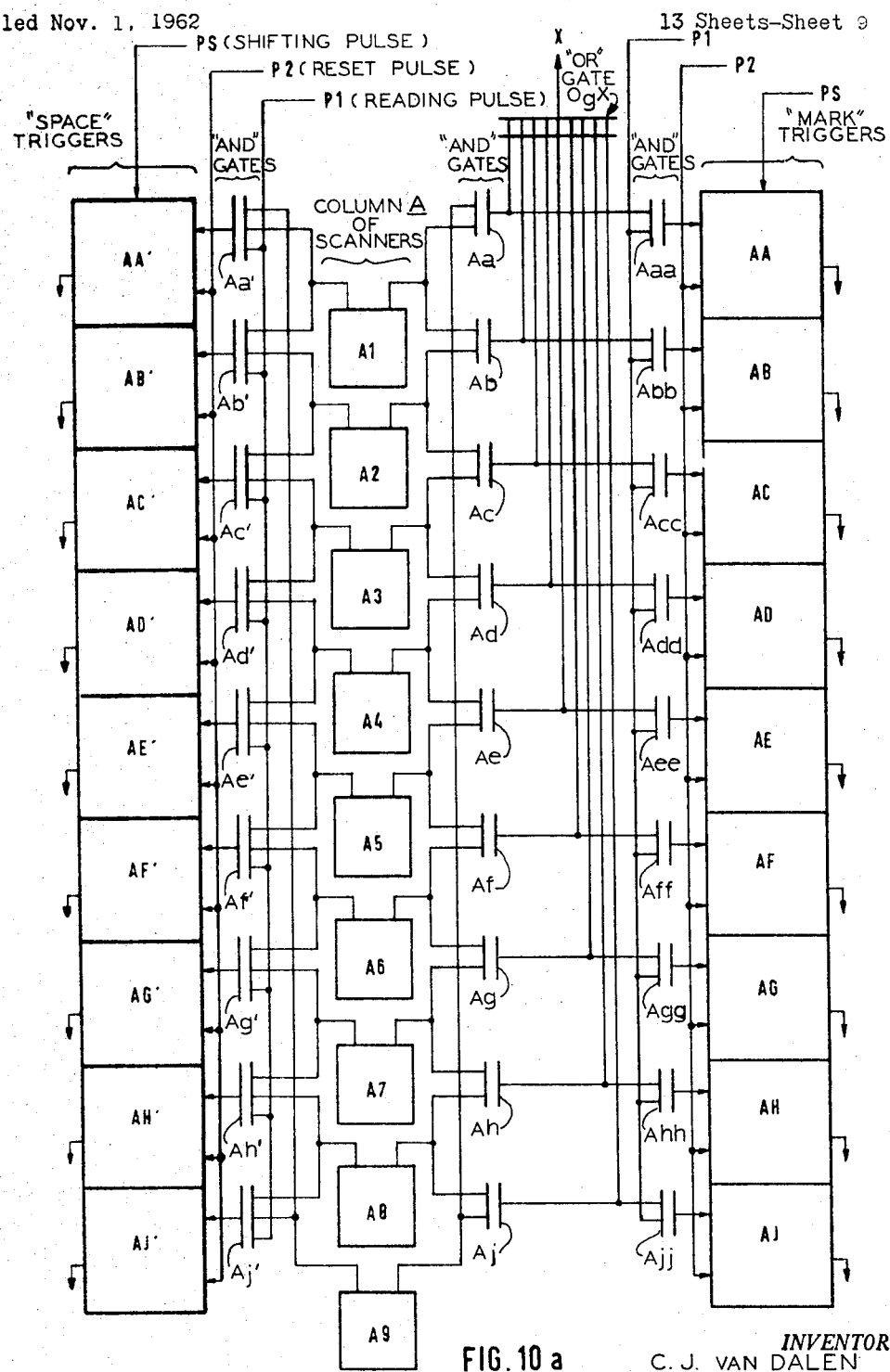

Feb. 20, 1968  C. J. VAN DALEN ET AL  3,370,271
READING-DEVICE FOR AN INFORMATION BEARER
Filed Nov. 1, 1962                                    13 Sheets-Sheet 13

INVENTORS
C. J. VAN DALEN AND
H. C. A. VAN DUUREN
BY
ATTORNEY

United States Patent Office 3,370,271
Patented Feb. 20, 1968

3,370,271
READING-DEVICE FOR AN INFORMATION
BEARER
Christiaan Johannes van Dalen, Leidschendam, and Hendrik Cornelis Anthony van Duuren, Wassenaar, Netherlands, assignors to De Staat der Nederlanden, ten deze vertegenwoordigd door de Directeur-Generaal der Posterijen, Telegrafie en Telefonie, The Hague, Netherlands
Filed Nov. 1, 1962, Ser. No. 234,745
Claims priority, application Netherlands, Nov. 3, 1961, 271,032
13 Claims. (Cl. 340—146.3)

ABSTRACT OF THE DISCLOSURE

The invention relates to a reading-device for an information bearer provided with rows of characters having code-elements arranged in $n$ rows and $m$ columns, in which the information bearer moves with respect to the scanners in the direction of said rows, the scanning, at least of the elements in one column, occurring simultaneously and with a tolerance in the direction of the columns.

---

Thus, according to this invention, for characters that do not pass into each other in the case of a simultaneous cyclic transposition of the elements within the columns, a greater tolerance is obtained by making, in the direction of the tolerance, an uninterrupted series of optical images of each character to be read, and reading these images. This series of images is made in such a way that at least that part of the series which is formed in the normal scanning-place, is projected there for scanning, and the results of the scannings in this place are also cyclically transposed simultaneously within the columns for insuring determination of the signal, whether it is out of horizontal alignment with the motion of the characters by the image maker or not.

BACKGROUND OF INVENTION

A prior art device for reading similar characters has been described in the copending U.S. patent application Ser. No. 72,666 filed Nov. 30, 1960 of Van Duuren assigned to the present assignee. In this copending application the scanning occurs with a tolerance in the direction of the columns, because not one set of scanners is used for scanning the code elements in one column, but more than one, notably three. The scanning-results provided by each set are checked per character for the acceptability of the code combination of the self-checking code used. Every valid combination of results is accepted. If a shift of not even one full code element occurred, this prior reading-device would have to contain one further set of scanners in order to accept characters which had such a shift, and any further increase of the tolerance in this device could only be obtained by adding more or other sets of scanners and their associated amplifiers.

Furthermore, with a view to a correct scanning in the horizontal direction, synchronizing elements or guide strips were added to each character on the information bearer which synchronization elements also are scanned by the reading device according to this copending application to indicate the moments at which the scanning results of the sets of scanners of the character code elements in a column must be tested.

DESCRIPTION (A) Objects and advantages

The present invention, however, aims at providing a greater tolerance in the direction of the columns than that provided in said above application without having to use any more scanners than would be required in the absence of such a greater tolerance.

Furthermore this invention eliminates the use of guide strips or synchronizing elements with each character on the information bearer by providing characters with at least one code element which contrasts with the background or the bearer, located in each of the outside columns, so that the scanning of all the $m$ columns of a character is effected simultaneously, notably at the moment when scanners in both the outside columns scan the said code elements.

(B) Brief description of the views

The above mentioned and other features and objects of this invention and the manner of attaining them will become more apparent and the invention itself will be understood best by reference to the following description of embodiments of the invention taken in conjunction with the accompanying drawings, wherein:

FIG. 3 is a chart of all the combinations of code elements for which the characters or figures "0" through "9" are selected which can be used in the reading device of this invention for a pattern of elements in an area as shown for one character in FIG. 1;

FIGS. 6 through 9 are perspective schematic diagrams similar to FIG. 5 of different positions of the figure "8" as it moves by a projecting lens according to another embodiment of this invention using only normal mirrors;

Figure 1:
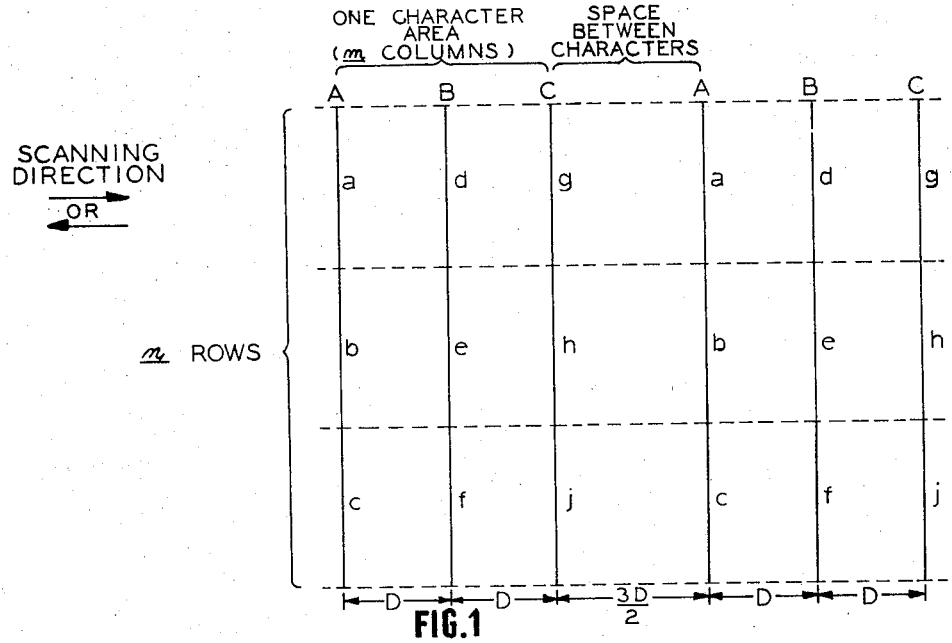
FIG. 1 is a schematic diagram of one embodiment of how the code elements can be arranged in $n$ rows and $m$ columns in the areas for each of two adjacent characters.

(C) Detailed description (1) *The character.*—In FIG. 1 there are $m$ or three parallel vertical lines or columns, A, B and C, each divided into $n$ or three parts, $a$–$b$–$c$, $d$–$e$–$f$ and $g$–$h$–$j$ forming horizontal rows, respectively, all of which form a character area. Each of these parts or pieces of line may or may not be present in this area and the possible combinations of these nine parts or code elements can be used to represent characters which may also be visually readable. The presence or absence of the pieces of line, marks, or elements $a$ through $j$ can be ascertained by means of scanners containing photocells (see blocks A1 through C9 in FIG. 2). To provide a protection against the acceptance of a wrong scanning result as a result of irregularities occurring in the impression of the character, or of a disturbed working of a scanner, each code element can be scanned by three scanners placed above each other along this vertical line corresponding to that element. In case these scanners give different results, only a result provided by two adjacent scanners is accepted.

Figure 2:
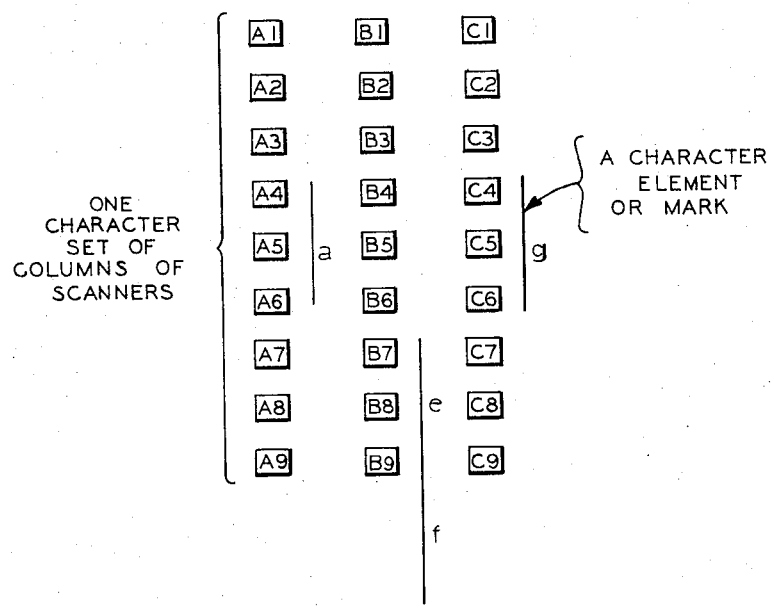
FIG. 2 is a schematic diagram of the elements of a character arranged in an area according to FIG. 1 and shifted with respect to the squares representing the scanners for said character.

If the characters move in a horizontal direction past the scanners A1 through C9, it is possible that they get shifted with respect to each other in a vertical direction. FIG. 2 illustrates the situation in which the character passes the scanners A1 through C9 (represented by squares) too low by the length of one full code element *f*. To read this off-centered character, an additional row of groups of three scanners and associated amplifiers could be provided below the existing rows shown in FIG. 2, or, if a shift of a whole character is to be admitted, even three such rows.

According to this invention a more attractive solution to this off-center problem is obtained, however, by optically providing another image of the character above the existing one. In this case the results of the scanning will have to be subjected to some cyclic transpositions in a vertical direction, to make them agree with the unshifted state. If this is done, it must be insured that the code elements are so attributed to the characters that no characters pass into each other in this transposition.

Figure 3:
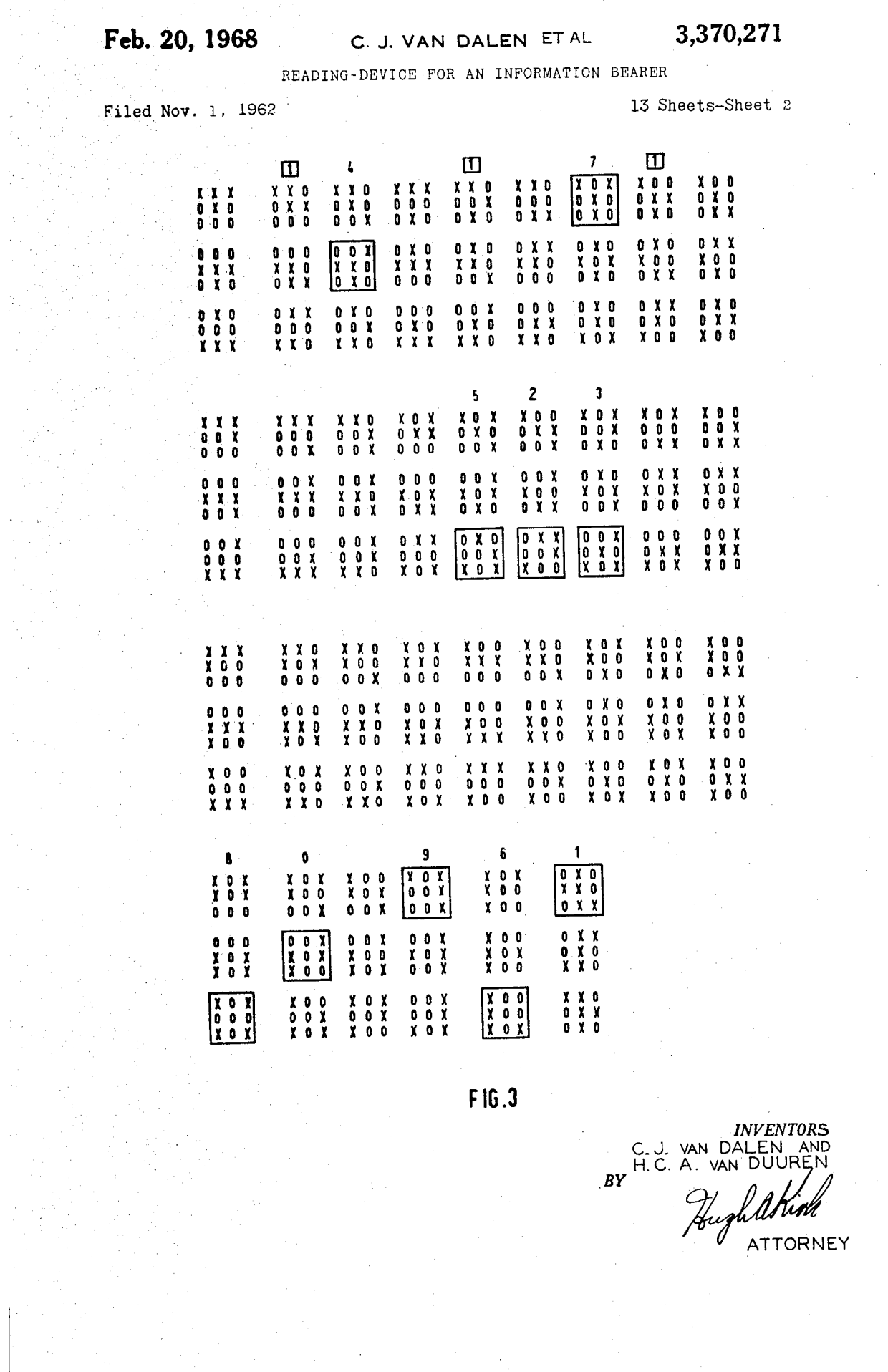

FIG. 3 shows a chart of an example of such an attribution of all possible combinations of marks and spaces and their three cyclic transpositions for this case of a nine-element code having a piece of line for each of four of the code elements and no piece of line or a space for each of five of the code elements, the elements being represented in this figure by crosses and circles, respectively. Each three combinations that pass into each other by cyclic transposition are shown below each other and at the most, only one of these three cycle combinations is used for a character (see the ones enclosed in squares). Moreover, only those combinations have been used, in which there occurs at least one piece of line, or a mark element, in each of the outer columns, in order that during the horizontal movement the correct scanning-moment can be fixed with certainty. The top three rows of character areas show one element X in each outside column, the second three rows of character areas show one element in the left outside column and two elements X in the right outside column and the third three rows are vice versa from the second. The last three rows of characters show in the first three columns two X's in each outside column and the next two columns show one and three and three and one X elements in each of the outside columns. The last column is a special column for the figure "1" as will be described later. Thus the scanning moment is only made when, during the horizontal movement of the information bearer at least one piece of line is found in both of the two outer columns (A and C in FIG. 1). In this way no synchronizing elements are required.

Figure 4:
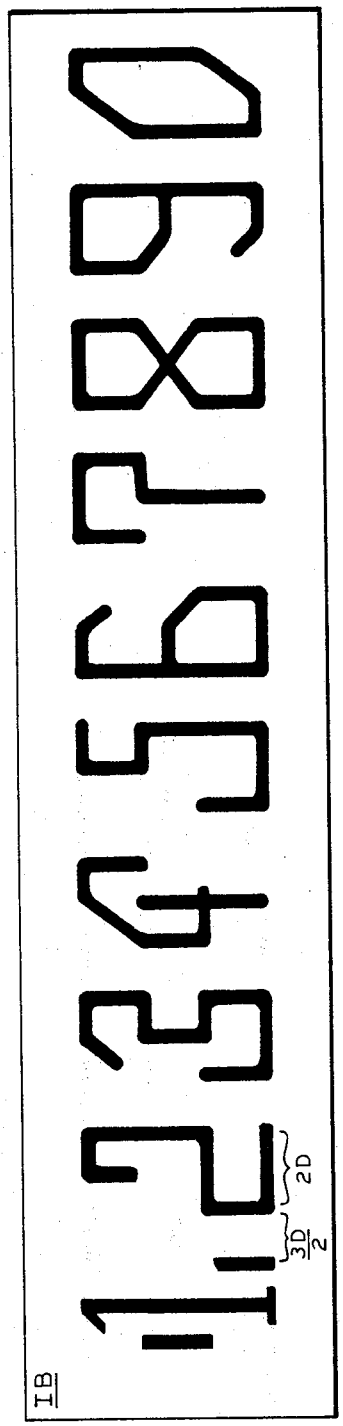
FIG. 4 shows the figures "0" through "9" themselves and their spacings on an information bearer, which figures correspond to the chart of code elements shown in FIG. 3.

If it is further seen to that in the illustrated case of FIGS. 1, 2, and 4 of equidistant columns, the centers of the nearest columns of two successive characters have a mutual distance, measured in a horizontal direction, of an odd number of times the half distance between the centers of the columns in a character, so that a combination of columns of two successive characters could never cause a wrong detection of a whole character, that is, the distance between characters is one half or one and a half times the distance D between columns in one character, so that elements in two adjacent characters can never be scanned as one character (see FIG. 1).

The combinations used which are outlined by a square in FIG. 3 correspond to the figures "1" through "9" and "0" shown on an information bearer IB in FIG. 4, so these figures cannot only be read by machine, but also can be read visually. In comparing the vertical lines in figures of FIG. 4 one will see that they correspond in location to the marks X in the blocks selected from FIG. 3.

However, the figure "1" does not possess four but five code elements represented by a piece of line or mark. In the other figures the constant ratio between the numbers of elements having and not having a piece of line or between marks and spaces, has been provided, so that only if one element passes from one kind to the other, and if another element undergoes a converse change, i.e. if there occurs a so-called transposition, then and then only can one character be mistaken for another.

Since the probability of a transposition is practically zero, when the printing or typewriting is either too heavy or too light, this provides a good protection against erroneous scanning. Likewise, in the reading-device voltage variations, or, if transistors are used, temperature variations, will cause only one kind of transition. If the combinations corresponding to that for the figure "1" are not attributed to other characters, when one of the pieces of line or mark X in the middle column is omitted, then it can also be said of the transition of the "1" into the other figures and conversely, that such a transition can only occur as a result of a transposition in combination with the omission or the addition of a line element.

Figure 5:
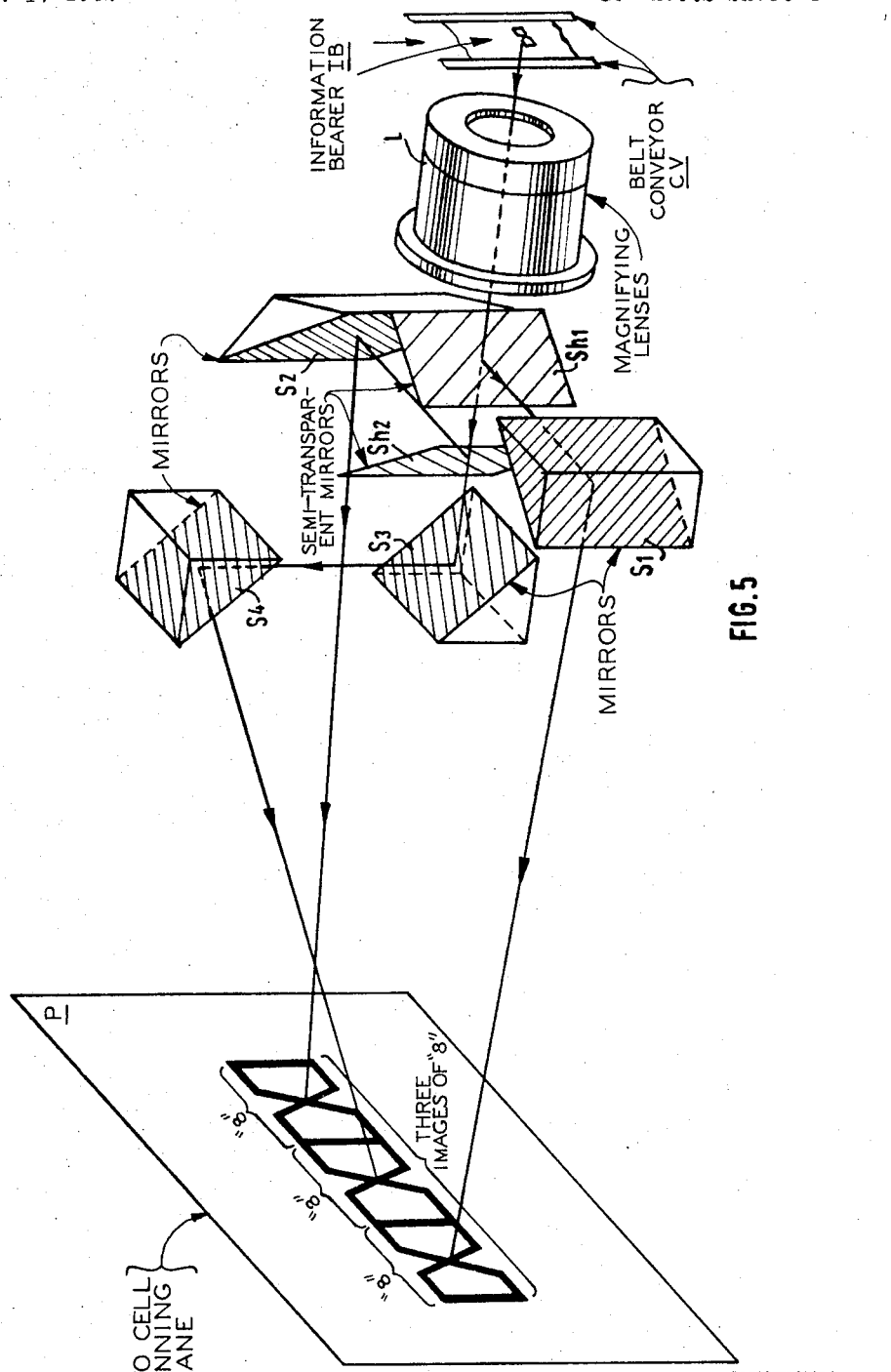
FIG. 5 is a perspective schematic diagram illustrating how the production of a series of images of the figure "8" may be produced by means of an optical system of lenses and semi- and normal mirrors, as the character "8" is moved by the system.

(2) *The optical projector.*—FIG. 5 shows how a character, in this case the figure "8" can be represented above and below the original figure for the sake of the scanning tolerance in the direction of the columns. In the case of scanning by means of photocells it will generally be desirable to provide a magnified picture or image of the character on a screen or scanning plane P. FIG. 5 illustrates a combination of optical magnification and multiple representation of the character "8" on the information bearer IB as it is moved relative to the lens L by a conveyor CV which may comprise a pair of belts. The magnification is obtained by means of a combination of lens system L. The two outside images in a plane P of the figure "8" are obtained via the semi-transparent mirror S*h* 1 and the mirror S1 on one hand; and via the semi-transparent mirror S*h* 2 and the mirror S2 on the other hand. The "8" that is only magnified is also projected via mirrors, viz S3 and S4, to ensure an equal intensity and equal light travelling distance for all images, thus a good definition of the three images in the same plane P is obtained. The mirrors S1–S4 are represented as prisms, different from reality and only to enhance the spatial effect of the figures. Thus the desired series of images has been obtained by adding some normal (S1–S4) and some semi-transparent (S*h* 1–2) mirrors.

It is also possible to use normal mirrors instead of the semi-transparent mirrors S*h* 1 and S*h* 2. This variant is shown in FIGS. 6–9, but different from FIG. 5 the mirrors S1–S4 are represented as plane mirrors. As compared with FIG. 5 the semi-transparent mirrors have been replaced by half-size totally reflecting mirrors S*t* 1 and S*t* 2.

FIGS. 6–9 represent the images of the figure "8" produced when this figure moves past the lens L at the right.

FIG. 6 shows this figure "8" in the middle of the central axis M. The information is projected by the lens L, passes by the edges of mirrors S*t* 1 and S*t* 2, strikes the mirror S3 and is cast by the mirror S4 on the projection plane P.

FIG. 7 shows the information at the very right of the central axis M. The information is projected by the lens L, passes by the mirror S*t* 1, strikes the mirror S*t* 2 and is cast by the mirror S2 on the projection plane P.

FIGURE 8 shows the information at the very left of the central axis M. The information is projected by the lens L, strikes the mirror S*t* 1 and is cast by the mirror S1 on the projection plane P.

Thus the extreme positions are always projected in the same place as the central position.

FIG. 9 illustrates a partial shift of the information. In this case the information is projected by the lens L, strikes partly the mirror S*t* 1, passes by the mirror S*t* 2, strikes partly the mirror S3 and is cast by the mirrors S1 and S4 on the projection plane P to form a combination figure there, which the scanning cells turn into the same output signal as the figure "8" after they have been shifted through a cycle as described later by pulses PS in FIGS. 10*a* through 10*c* and 10*g* and 11.

In practice a threefold image will suffice, though in principle of course a more than threefold representation of the character is possible as well.

Figure 10:
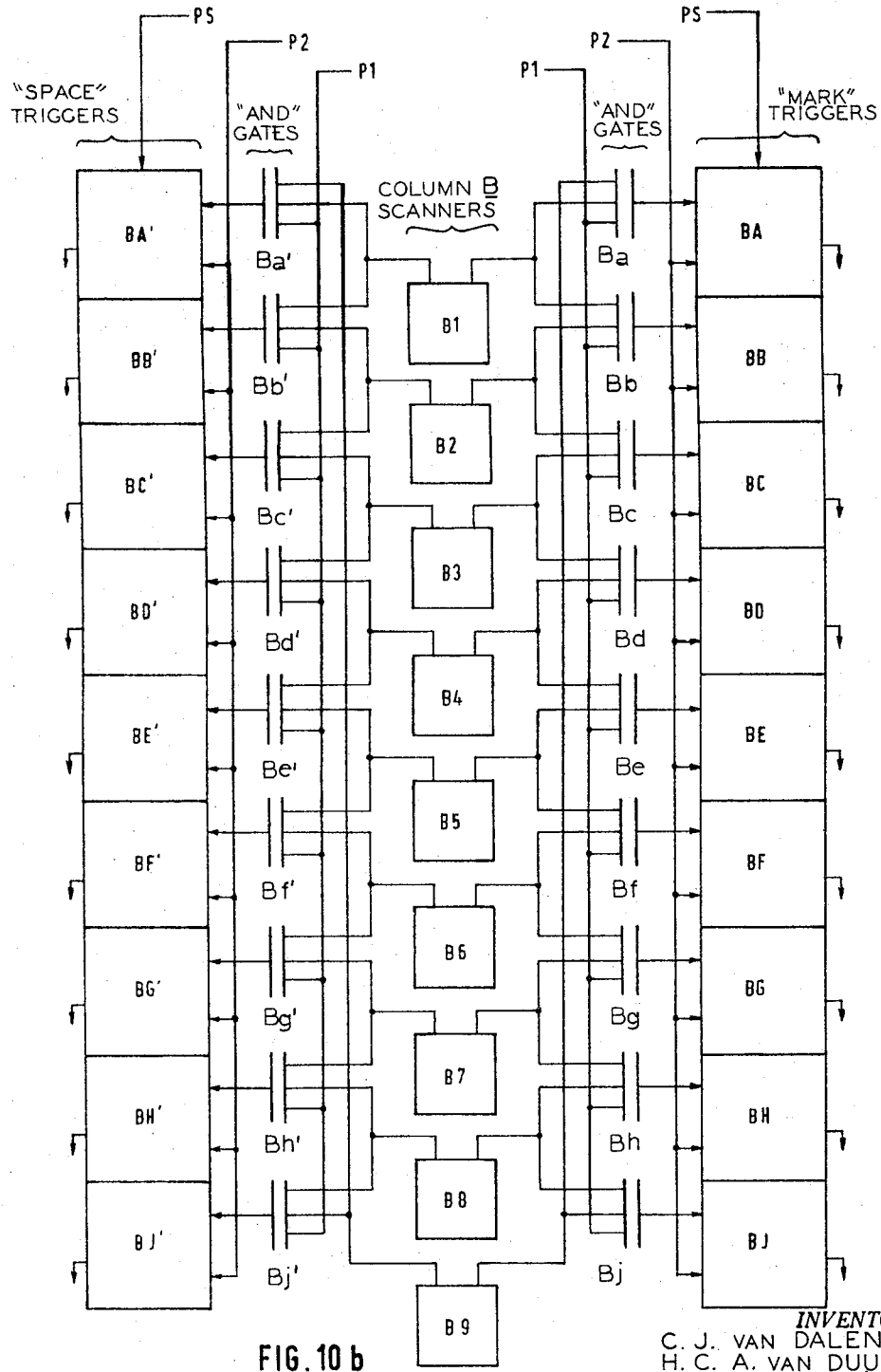
FIGS. 10a through 10g are parts of a whole schematic block wiring diagram of a scanning device for a set of scanners as shown in FIG. 2.
Figure 10C:
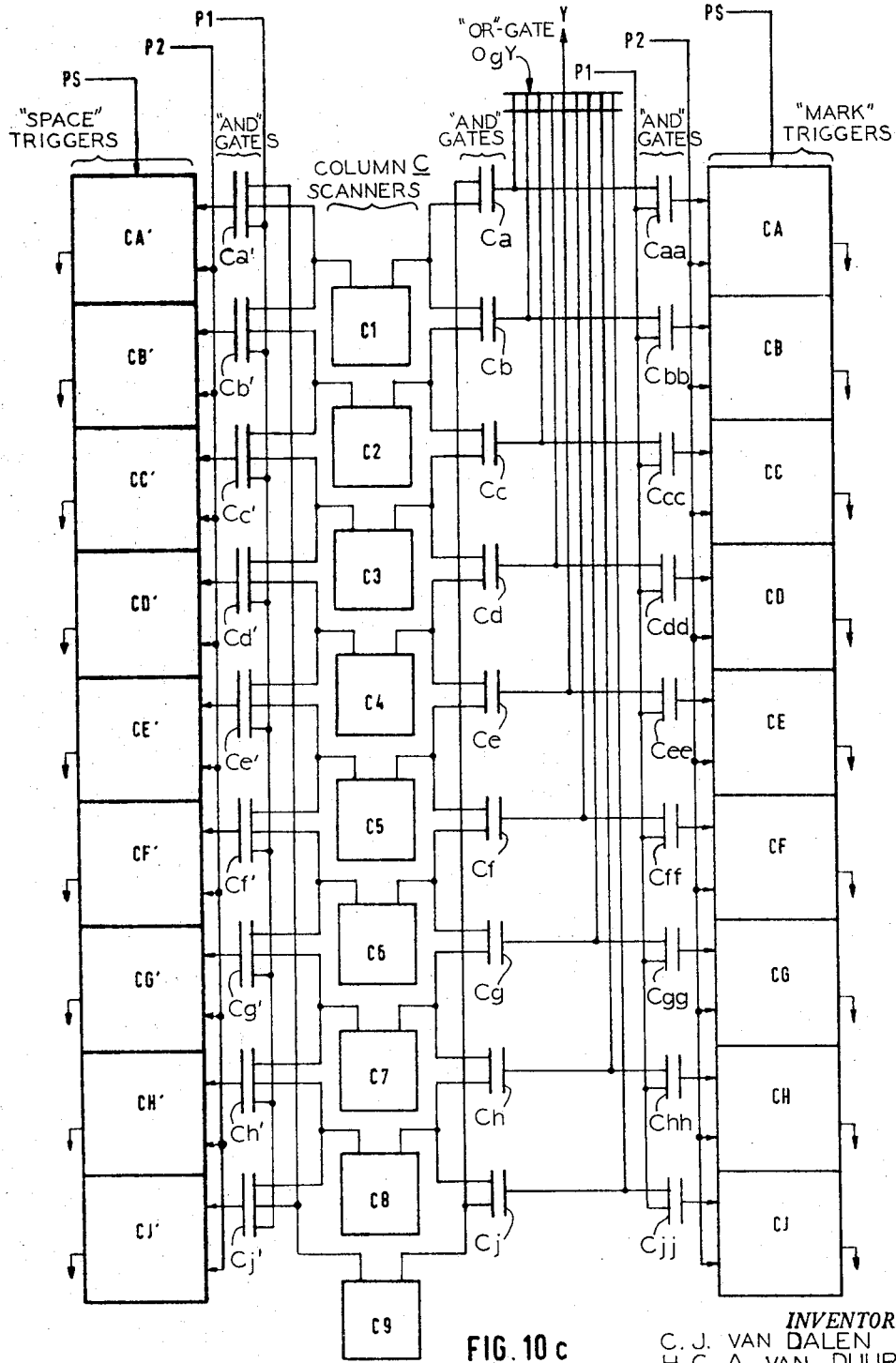

(3) *The scanning circuits.*—In FIGS. 10a through 10g are shown the parts of a whole schematic block wiring diagram of the reading-device proper. The nine photocells for the left-hand column, together with the amplifiers and triggers directly connected to them, are represented by the scanner blocks A1 to A9 (FIG. 10a). Similarly those for the centre column B are represented by the scanner blocks B1 to B9 (FIG. 10b) and those for the right-hand column C by the scanner blocks C1 to C9 (FIG. 10c). The observation or non-observation of a piece of line or elements, or a "mark" or "space," respectively results in a positive potential at the right-hand output terminal or at the left-hand output terminal, respectively, or such a scanner block. In accordance with what has been said, viz that the scanning-results may only be accepted, if they are provided by at least two adjacent scanners, the corresponding output terminals of each two adjacent blocks are connected to an AND-circuit. In view of the cyclic transposition of the scanning-results, which must be performed the blocks A1 and A9, B1 and B9, C1 and C9 are also considered as adjacent in this respect.

The output terminals of the AND-circuits A$a$–A$j$ belonging to the right-hand output terminals of the blocks A1 to A9 are connected to an OR-circuit O$g$X. If one of the first mentioned output terminals is positive, i.e. if at least one piece of line mark, or element is observed in the left-hand column, the output terminal of this OR-circuit O$g$X becomes positive too and a positive pulse is delivered (se wave form X in FIG. 11). In like manner the output terminals of the AND-circuits C$a$–C$j$ (see FIG. 10c) belonging to the right-hand output terminals of the scanner blocks C1 to C9 are connected to an OR-circuit O$g$1 (see FIG. 10). If at least one piece of line mark, or element is observed in the right-hand column, there appears, in this case too, a pulse, designated by wave form Y in FIG. 11. The output terminals of the two OR-circuits are connected via an AND-circuit A$ip$ (FIG. 10g) to a so-called pulse program circuit IP. This circuit IP consisting of a combination of a generator, counters and triggers, ensures the generation of the positive reading pulse P1, the resetting and error indicating pulse P2, and a series of shifting or transposing pulses PS in the presence of both the synchronization pulses X and Y (see wave forms in FIG. 11).

Besides being connected to the input terminal of an OR-circuits O$g$X and O$g$Y in FIGS. 10a and 10c, the output terminals of the said AND-circuits A$a$–A$j$, C$a$–C$j$ in FIGS. 10a and 10c are connected to other AND-circuits A$aa$–A$jj$ and C$aa$–C$jj$. The input terminal of such further AND-circuits A$aa$–A$jj$ and C$aa$–C$jj$, and also the input terminals of the AND-circuits A$a'$ to A$j'$, B$a'$ to B$j'$, and C$a'$ to C$j'$, not connected to an OR-circuit O$g$X or O$g$Y are each also connected to the output terminal of the pulse program circuit IP at which the pulse P1 appears. As soon as this happens, those AND-circuits, of which the other input terminals are positive as well, will produce a positive potential at its output terminal and, consequently change over the storing trigger connected to it (AA'–AJ', AA–AJ, BA'–BJ', BA–BJ, CA'–CJ', CA–CJ), due to which the output terminal shown from each corresponding changed-over trigger, becomes positive. So the change over of the storing triggers occurs, after it has appeared from the occurrence of the reading pulse P1 that in a horizontal sense the scanners are in the correct place for reading a character.

Figure 10D:
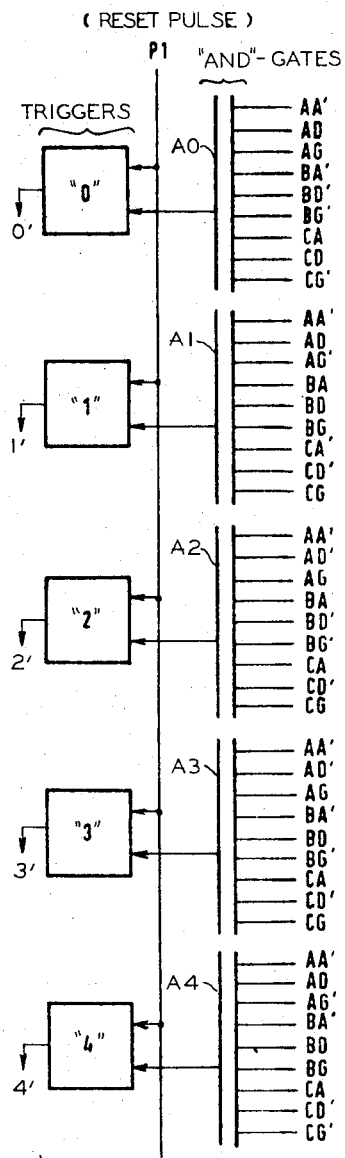
Figure 10E:
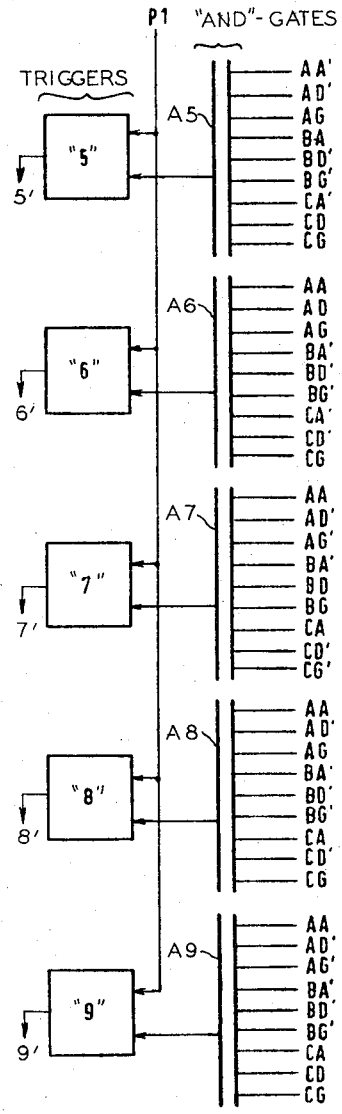
Figure 10:
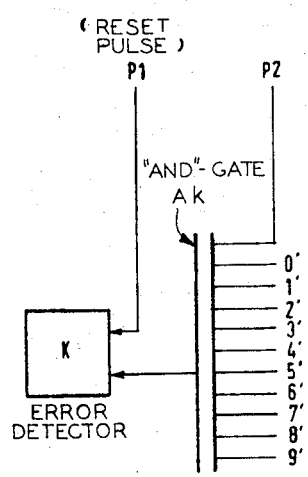
Figure 10:
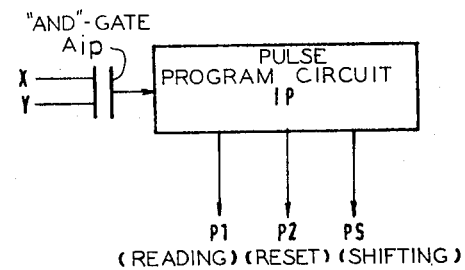
Figure 11:
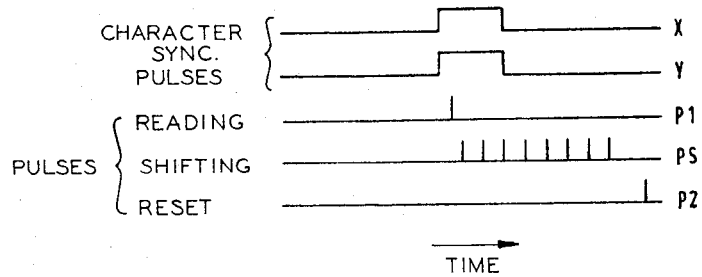
FIG. 11 is a wave form time diagram of the pulses occurring in the device of FIGS. 10a through 10g.

Further FIGS. 10d and 10e illustrate the block wiring diagram for detection of the ten figures "0" through "9." For this purpose there is for each figure, an AND-circuit A0 through A9 connected to a preselected set of storage trigger output terminals AA' to CG which are associated with corresponding pairs of scanners and must be positive when the relevant figure is read. After the appearance of a pulse P1 the above-mentioned series of eight shifting pulses PS is applied to the shifting circuits constituted by the storing triggers AA'–AJ', AA–AJ, BA'–BJ', BA–BJ, CA'–CJ', CA–CJ. When some figure is scanned, the polarity of all the input terminals of one of these AND-circuits A0 through A9 will be positive at some moment in the cycle of trigger states, and the relevant figure will be detected by the change-over of a trigger "0" through "9."

In case no signal is detected, the pulse P2, which appears after the shifting pulse series PS, ensures the signalling of the faulty scanning. For this purpose that output terminal of the pulse program IP, on which appears the reset pulse P2 and those output terminals 0' through 9' of the character detection circuits "0" through "9," which are positive if the relevant character is not, and negative if it is detected, are connected to an AND-circuit A$k$, as is shown in FIG. 10f. After a faulty scanning, the appearance of the reset pulse P2 will cause the change-over of the trigger K connected to the output terminal of this AND-circuit A$k$, thus signalling an error.

The reset pulse P2 is also applied to the second input terminals of the triggers AA'–AJ', AA–AJ, BA'–BJ', BA–BJ, CA'–CJ', CA–CJ, which restore to normal in consequence. The triggers K and "0" through "9" are restored to the normal state, as soon as the pulse P1 appears during the scanning of the next signal, this pulse being applied to the second input terminal of each said trigger.

While we have illustrated and described what we regard to be the preferred embodiment of our invention, nevertheless it will be understood that such is merely exemplary and that numerous modifications and rearrangements may be made therein without departing from the essence of the invention.

What is claimed is:

1. A reading device for an information bearer provided with rows of characters having:
   a predetermined number of code elements arranged in rows and columns which characters remain distinct even when the rows of elements are cyclically interchanged, said device comprising:
   (A) means for optically transforming each character into a coherent image to fill a predetermined area on a scanning plane regardless of the transverse centering of said characters as they are moved relative to said optical transforming means,
   (B) means for moving said characters relative to said optical transforming means parallel to said rows,
   (C) a number of means corresponding with the number of code elements in the columns of one character for simultaneously scanning the elements in the columns of said coherent image in said predetermined area,
   (D) means for storing the output of each said scanning means,
   (E) separate means responsive to said storing means for detecting each of said characters scanned, and
   (F) means for simultaneously shifting said columns of said elements stored in said storing means through a complete cycle to compensate for any row misalignment of said characters on said information bearer with said optical transforming means.

2. A reading device according to claim 1 wherein said information bearer comprises a plurality of adjacent scanning areas each of which is divided into $m$ vertical columns and $n$ horizontal rows to provide an $m \times n$ divisions for scanning elements for each character area.

3. A reading device according to claim 1 wherein said separate responsive means include AND-gates and trigger circuits.

4. A reading device according to claim 1 wherein said optical transforming means includes a magnifying lens and mirror means for projecting said character as a coherent image in said predetermined area on a plane for said scanning means.

5. A reading device according to claim 4 wherein said mirror means comprises normal and half-silvered mirrored means.

6. A reading device according to claim 1 wherein each character has at least one contrasting element in each outside column, and wherein said columns are equidistant in each character area and adjacent column distances between adjacent characters on said information bearer are different than said distance by a factor of one-half this distance, whereby columns of adjacent characters cannot simultaneously be scanned by said scanning means, and wherein said device includes means for simultaneously employing the outputs of said scanning means for the images of the outside columns of each character for detecting the presence of a whole character and for operating said storing means.

7. A reading device according to claim 6 wherein said simultaneous detecting means comprises a pulse generator means (IP) and OR-gates (OgX, OgY) connected to said scanning means.

8. A reading device according to claim 1 including means for indicating an error in a scanned character.

9. A reading device according to claim 8 wherein said indicating means includes an AND-gate.

10. A reading device for an information bearer provided with rows of characters having code elements arranged in rows and columns, the combination of code elements for one character differing from that for another character even at a cyclic transposition of the rows of elements, said device comprising:
(A) means for optically transforming each character into a coherent image to fill a given area on a scanning plane regardless of the transverse centering of said characters as they are moved relative to said optical transforming means, which coherent image comprises at least all of the column elements of that character,
(B) means for moving said characters relative to said optical transforming means parallel to said rows,
(C) a number of means corresponding with the number of code elements in the columns of one character for simultaneously scanning in said predetermined area the elements in the columns of said coherent image,
(D) means for storing the output of each said scanning means,
(E) separate means responsive to said storing means for detecting each of said characters scanned, and
(F) means for simultaneously shifting said columns of said elements stored in said storing means through a complete cycle to compensate for any row misalignment of said characters on said information bearer with said optical transforming means.

11. A reading device for an information bearer provided with rows of characters having code elements arranged in rows and columns, wherein each character has at least one contrasting element in each outside columns, said device comprising:
(A) means for optically transforming each character into an image on a scanning plane,
(B) means for moving said characters relative to said optical transforming means parallel to said rows,
(C) means for scanning said image formed from each said character, and simultaneously scanning all of said elements in at least one of said columns of said image,
(D) means for storing the output of each said scanning means,
(E) separate means responsive to said storing means for detecting each of said characters scanned,
(F) means for simultaneously shifting said columns of said elements stored in said storing means through a complete cycle to compensate for any row misalignment of said characters on said information bearer with said optical transforming means,
(G) means for simultaneously employing the outputs of said scanning means for the images of the outside columns of each character for detecting the whole character and for operating said storing means, and
(H) means including an AND-gate for indicating an error in a scanned character.

12. A reading device for an information bearer provided with rows of characters having code elements arranged in rows and columns, said device comprising:
(A) means for optically transforming each character into an image on a scanning plane including a magnifying lens and only normal mirror means for projecting said character on said plane for the scanning means,
(B) means for moving said characters relative to said optical transforming means parallel to said rows,
(C) means for scanning said image formed from each said character, and simultaneously scanning all of said elements in at least one of said columns of said image,
(D) means for storing the output of each said scanning means,
(E) separate means responsive to said storing means for detecting each of said characters scanned, and
(F) means for simultaneously shifting said columns of said elements stored in said storing means through a complete cycle to compensate for any row misalignment of said characters on said information bearer with said optical transforming means.

13. A reading device for an information bearer provided with rows of characters having code elements arranged in rows and columns, said device comprising:
(A) means for optically transforming each character into an image on a scanning plane,
(B) means for moving said characters relative to said optical transforming means parallel to said rows,
(C) means for scanning said image formed from each said character, and simultaneously scanning all of the said elements in at least one of said columns for said image,
(D) means including AND-gates and trigger circuits for storing the output of each said scanning means,
(E) separate means responsive to said storing means for detecting each of said characters scanned, and
(F) means for simultaneously shifting said columns of said elements stored in said storing means through a complete cycle to compensate for any row misalignment of said characters on said information bearer with said optical transforming means.

References Cited

UNITED STATES PATENTS 3,069,079  12/1962  Steinbuch et al. ____ 235—61.11
3,104,369  9/1963   Rabinow et al. ____ 340—146.3

MAYNARD R. WILBUR, *Primary Examiner.*

JOHN F. MILLER, *Examiner.*

J. I. SCHNEIDER, *Assistant Examiner.*

UNITED STATES PATENT OFFICE
CERTIFICATE OF CORRECTION

Patent No. 3,370,271                                                February 20, 1968

Christiaan Johannes van Dalen et al.

It is certified that error appears in the above identified patent and that said Letters Patent are hereby corrected as shown below:

Column 3, line 25, after "elements", second occurrence, insert -- marks and spaces --; line 51, cancel "to"; line 74, cancel "only". Column 5, line 16, "or" should read -- of --; line 20, cancel "an"; line 21, "circuit" should read -- circuits $Aa'-Aj'$, and $Aa-Aj$. --; line 36, "Ogl" should read -- $OgY$ --; line 48, cancel "an"; line 54, after "$Ba'$ to $Bj'_j$" insert -- $Ba$ to $Bj$, --. Column 6, line 4, after "some" insert -- character or --.

Signed and sealed this 29th day of July 1969.

(SEAL)
Attest:

Edward M. Fletcher, Jr.                                  WILLIAM E. SCHUYLER, JR.
Attesting Officer                                                    Commissioner of Patents